US006854912B2

(12) United States Patent  (10) Patent No.: US 6,854,912 B2
Dyer et al.  (45) Date of Patent: Feb. 15, 2005

(54) MOP ASSEMBLY AND CART

(75) Inventors: John J. Dyer, Shoreview, MN (US); Gary L. Olson, Shoreview, MN (US); David A. Maurer, Muskegon, MI (US); Raymond N Maurer, Seminole, FL (US); Joseph J. Fodrocy, Muskegon, MI (US)

(73) Assignee: 3M Innovative Properties Company, St. Paul, MN (US); by said John J. Dyer and Gary L. Olson ( * ) Notice: Subject to any disclaimer, the term of this patent is extended or adjusted under 35 U.S.C. 154(b) by 0 days.

(21) Appl. No.: 10/454,051

(22) Filed: Jun. 4, 2003

(65) Prior Publication Data

US 2004/0247370 A1 Dec. 9, 2004

(51) Int. Cl.[7] .............................................. A47L 13/26
(52) U.S. Cl. ........................ 401/139; 401/137; 401/131
(58) Field of Search ................................ 401/136–140, 401/131, 289, 279, 270, 268

(56) References Cited

U.S. PATENT DOCUMENTS

| | | | | |
|---|---|---|---|---|
| 2,187,671 | A | * 1/1940 | Suddarth | 401/205 |
| 2,768,401 | A | * 10/1956 | Becker et al. | 222/191 |
| 2,990,979 | A | * 7/1961 | Gordon et al. | 222/482 |
| 4,588,318 | A | * 5/1986 | O'Brien et al. | 401/146 |
| 4,863,299 | A | * 9/1989 | Osberghaus et al. | 401/15 |
| 6,612,768 | B2 | * 9/2003 | Zorzo | 401/138 |
| 2002/0186996 | A1 | * 12/2002 | Miller | 401/140 |

FOREIGN PATENT DOCUMENTS

DE  1932110 A1 * 2/1981
WO  WO-00/54647 * 9/2000

* cited by examiner

Primary Examiner—Gregory L. Huson
Assistant Examiner—Huyen Le
(74) Attorney, Agent, or Firm—William L. Huebsch

(57) ABSTRACT

A mop assembly including a mop head and handle, and a supply of liquid connected to a valve assembly on the handle adjacent the mop head. The valve assembly includes a length of resiliently flexible tubing that has a portion extending transversely through the handle and first and second members on opposite sides of the length of tubing that are relatively movable between a closed position at which the first and second members pinch together opposite sides of the length of tubing to stop the flow of liquid through it, and an open position at which the first and second members are spaced apart to afford flow of liquid through it. Should the tubing become plugged, it can easily be replaced by disconnecting one end from a liquid supply length of tubing, withdrawing the tubing from between the first and second members, and then installing a new length of tubing. A storage cart for use with the mop assembly includes an elongate upwardly projecting main portion having walls providing a side surface, and an elongate tray portion that provides a receptacle adapted to receive the mop head. The tray portion is mounted on a bottom end of the main portion for relative movement between a closed position at which the side surface covers an open side of the receptacle to thereby afford retention of the mop head in the receptacle; and an open position with the tray portion disposed at about a right angle with respect to the main portion so that the mop head can be inserted into or removed from the receptacle and so that the bottom wall can be supported along a horizontal surface such as a floor surface with side walls of the receptacle projecting upwardly.

26 Claims, 9 Drawing Sheets

MOP ASSEMBLY AND CART

FIELD OF THE INVENTION

The present invention relates to mop assemblies of the type used for applying liquids (e.g., floor coatings, floor cleaners, floor sealers, floor finishes, disinfectants, etc.) to a surface such as the surface of a floor, which mop assemblies include a mop head, a handle pivotally attached to the mop head by which the mop head can be manually moved along the surface; a valve assembly mounted on the handle adjacent the mop head connected by a hose to a supply of liquid supported above the mop head, which valve is normally closed to stop the flow of liquid through the valve but can be manually opened to allow liquid from the container to flow through the valve and be deposited on the surface at a position close to the mop head.

BACKGROUND OF THE INVENTION

Mop assemblies of the type used for applying liquids (e.g., floor wax, polyurethane, or other floor finishing or floor sealing materials, disinfectants, etc.) to a surface such as the surface of a floor are known which include a mop head, a handle pivotally attached to the mop head by which the mop head can be manually moved along the surface; a valve assembly mounted on the handle adjacent the mop head connected by a hose to a supply of liquid supported above the mop head (e.g., in a back pack worn by the person using the mop), which valve is normally closed to stop the flow of liquid through the valve but can be manually opened to allow liquid from the container to flow through the valve and be deposited on the surface at a position close to the mop head from which the liquid can be spread over the surface by the mop head. Such mop assemblies are described in U.S. Pat. Nos. 4,119,386, 4,152,084, and 6,227,744, and in U.S. patent application Ser. No. 10/127,942 filed Apr. 23, 2002.

While such mop assemblies can be used effectively if they are thoroughly cleaned between each use, a significant problem can occur if certain liquids such as floor waxes or the like are allowed to remain in the valve assembly between uses. Such liquids can thicken and/or solidify when exposed to the atmosphere through the outlet opening of the valve, causing the valve to become sticky or even plugged because of the thickened or solidified material, and presenting a difficult clean up situation before the liquid delivery system on the mop will again operate properly.

DISCLOSURE OF THE INVENTION

The present invention provides a mop assembly for applying liquids (e.g., floor coatings, floor cleaners, floor sealers, floor finishes, disinfectants, etc.) that is generally of the type described above, but in which the structure of the valve assembly restricts the valve assembly from becoming sticky when it is not cleaned between uses, and, should the valve assembly become disabled by thickened or solidified liquids, allows the only part of the valve assembly in which such thickened or solidified material can occur to be quickly and easily changed by a person using the mop assembly.

According to the present invention there is provided a mop assembly for applying liquid to a surface such as the surface of a floor. The mop assembly comprises a mop head; an elongate handle having a first end pivotally attached to the mop head, and a portion adjacent a second end adapted to be manually engaged to move the mop head along the surface; a valve assembly mounted on the handle adjacent its first end, which valve assembly includes first and second members relatively movable between a closed position to stop the flow of liquid through the valve between inlet and outlet openings of the valve, and an open position allowing the flow of liquid between those openings, and a flexible hose for conveying liquid from a liquid container that is elevated above the mop head (e.g., in a back pack worn by the person using the mop) and the inlet opening of the valve assembly. The valve assembly in the present invention comprises a length of resiliently flexible elastic tubing having opposite ends providing the inlet and outlet openings for the valve, with the outlet opening positioned to deposit liquid passing through the valve on the surface at a position close to the mop head from which the liquid can be spread over the surface by manipulation of the mop head. A portion of the length of tubing between its inlet and outlet ends extends between the first and second members of the valve assembly, and the first and second members in their closed position press together opposite sides of the length of tubing to stop flow of liquid through the length of tubing, and in their open position are spaced apart to afford separation of the opposite sides of the length of tubing and flow of liquid through the length of tubing.

The length of tubing can be withdrawn from or inserted between the first and second members of the valve assembly in the open position of the valve assembly and the mop assembly includes a connector between the hose and the inlet end of the length of tubing affording manual removal and attachment of the length of tubing to facilitate replacement of the length of tubing in the mop assembly.

Thus, any thickening or solidification of liquid being dispensed due to improper cleaning of the valve assembly will occur in the length of tubing, and in the event that movement of liquid through the length of tubing becomes restricted or stopped because of such thickened or solidified material in the length of tubing, the length of tubing can either be stretched and squeezed to help pass the thickened or solidified material, or can easily and quickly be replaced by a person using the mop assembly.

In an embodiment of the mop assembly described herein the handle has a central passageway, the second member of the valve assembly is fixed with respect to the handle and forms an end to the passageway, and the first member of the valve assembly comprises a first part within and moveable longitudinally along that passageway. The portion of the length of tubing between its inlet and outlet ends extends transverse of the handle and the passageway between the first and second members of the valve assembly, and the valve assembly includes a spring biasing those members to their closed position. A manually engageable trigger member is pivotally mounted on the handle at its end opposite the mop head, and is connected by a connecting member within the passageway to the first member of the valve assembly so that manual pivoting of the trigger can move the first member to the open position of the valve members and thereby allow liquid to be dispensed on the surface.

The present invention also provides a storage cart for a mop assembly that may be the mop assembly described above or a similar mop assembly without its novel valve assembly. That storage cart includes an elongate main portion having longitudinally spaced top and bottom ends, and walls defining a second surface extending between its top and bottom ends; and an elongate tray portion having longitudinally spaced first and second ends, a bottom wall extending between its first and second ends and side walls projecting from the bottom wall, which side and bottom walls provide a receptacle for the mop head which will hold liquid when the bottom wall is lowermost and supported on a horizontal surface. The first end of the tray portion is mounted on the bottom end of the main portion for relative movement of the portions between (1) a closed position with distal edges of the side walls along the second surface of the main portion to afford retention of the mop head in the receptacle by the second surface of the main portion, and (2) an open position with the main and tray portions disposed at about a right angle with respect to each other so that the mop head can be inserted into or removed from the receptacle in the tray portion, and so that with the top end of the main portion projecting vertically upwardly from a horizontal surface such as the surface of a floor the bottom wall can be disposed along that surface with the side walls of the receptacle projecting vertically upwardly above the surface so that the mop head can be moved into or out of the receptacle. Latch members are provided on the main and tray portions for releasably retaining the main and tray portions in their closed position. Also, wheels are provided on the bottom end of the first portion that allow the storage cart to be rolled along a horizontal surface.

The tray portion can include a retaining wall on the distal ends of the side walls adjacent the first end of the tray portion to provide a liquid tight container at the first end of the tray portion for receiving and containing liquid from the receptacle (and from the mop head when it is in the receptacle) when the main and tray portions are in their closed position and top end of the main portion is projecting generally vertically upwardly.

One of the side walls adjacent the second end of the tray portion can have a passageway through which can extend the handle of the mop assembly when the head of the mop assembly is in the receptacle and the main and tray portions are in their closed position. A portion of the handle then projecting from the cart (parts of the handle can telescope together to reduce the length of that projecting portion) can be manually engaged to move the mop and cart along the horizontal surface. The main portion can also have a handle at its top end which can be manually engaged to move the cart along the surface.

BRIEF DESCRIPTION OF DRAWING

The present invention will be further described with reference to the accompanying drawing wherein like reference numerals refer to like parts in the several views, and wherein.

DETAILED DESCRIPTION OF THE INVENTION

Figure 1:
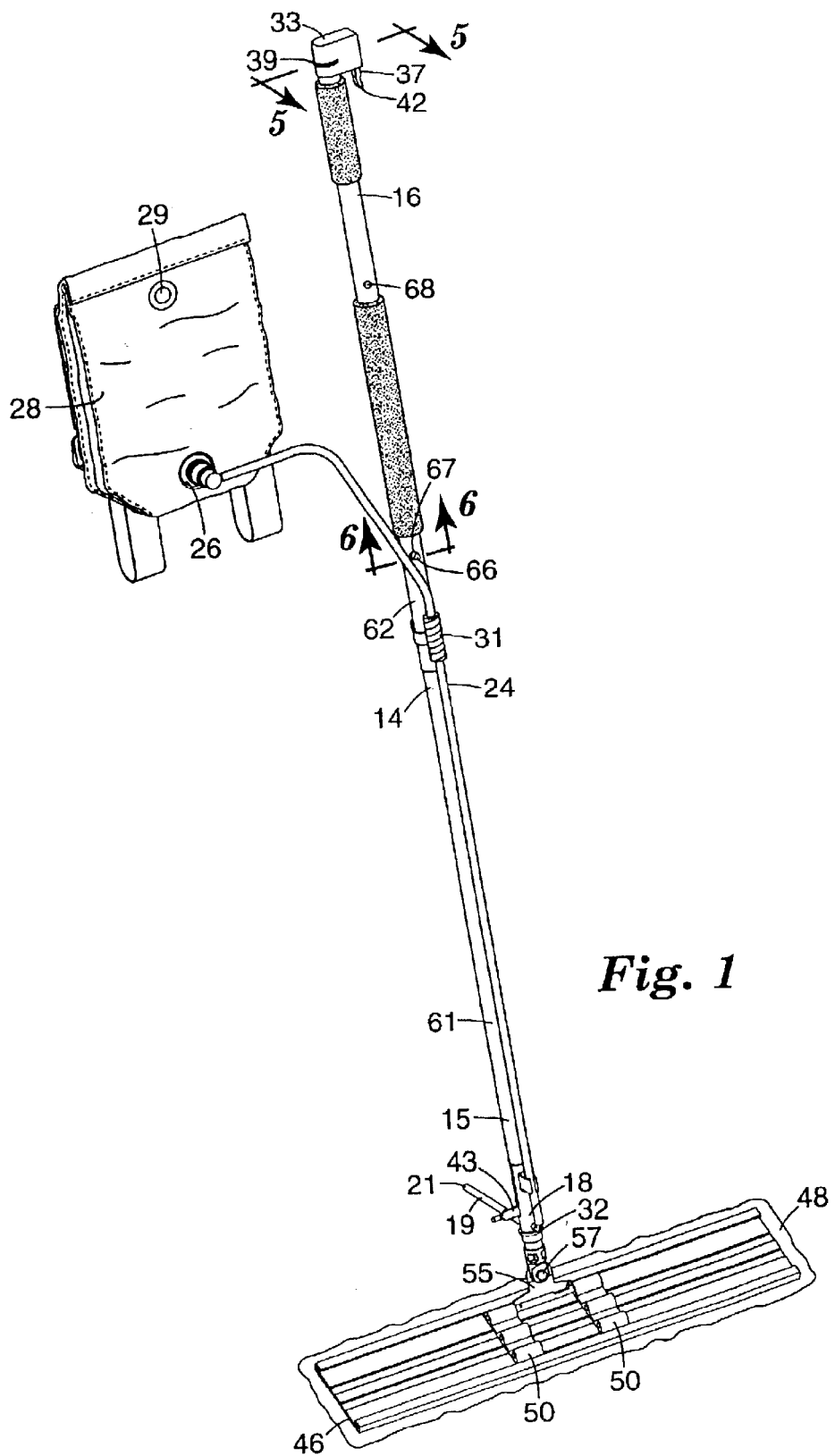
FIG. 1 is a perspective view of a mop assembly according to the present invention.
Figure 2:
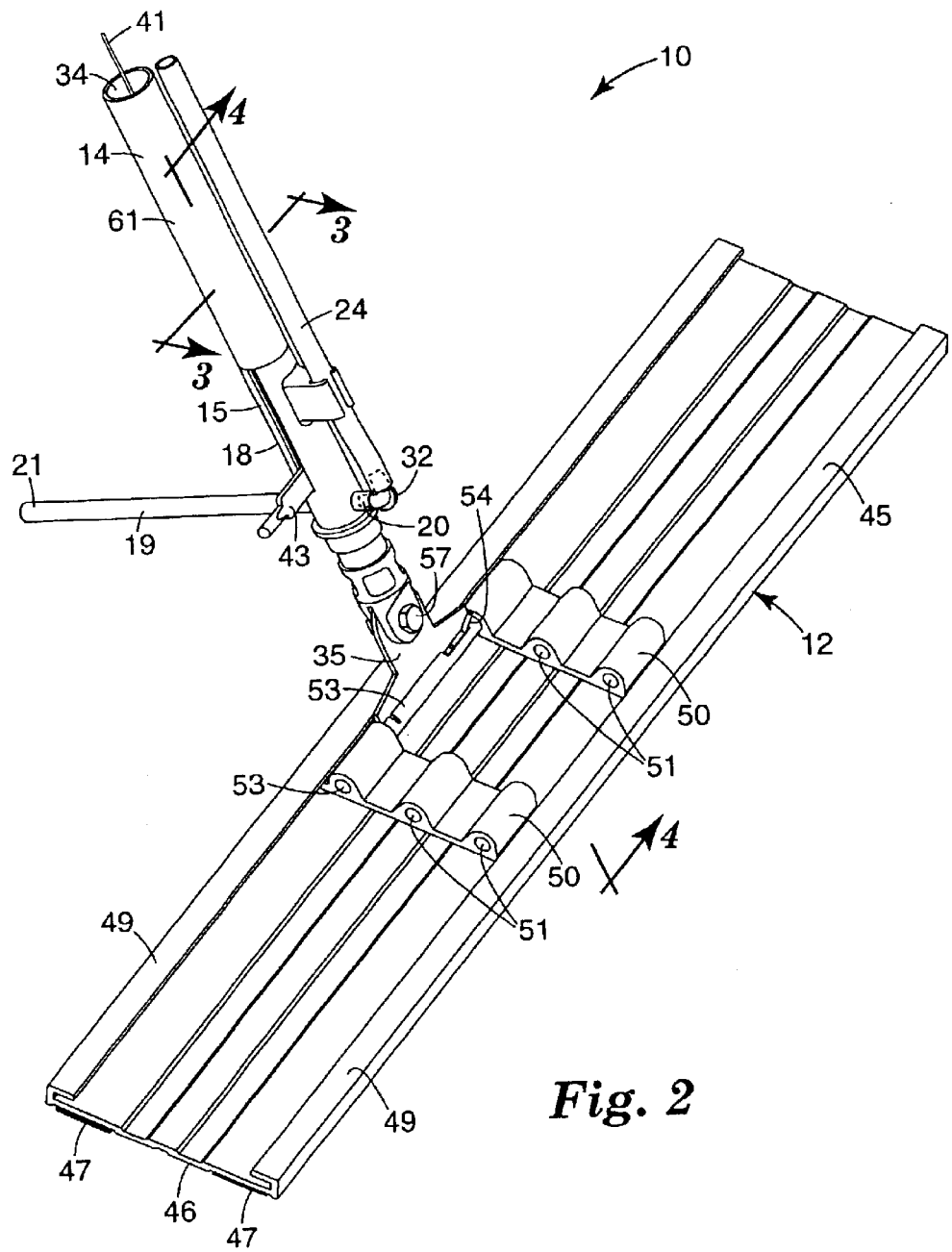
FIG. 2 is an enlarged perspective fragmentary view of a mop head and valve assembly included in the mop assembly of FIG. 1.
Figure 3:
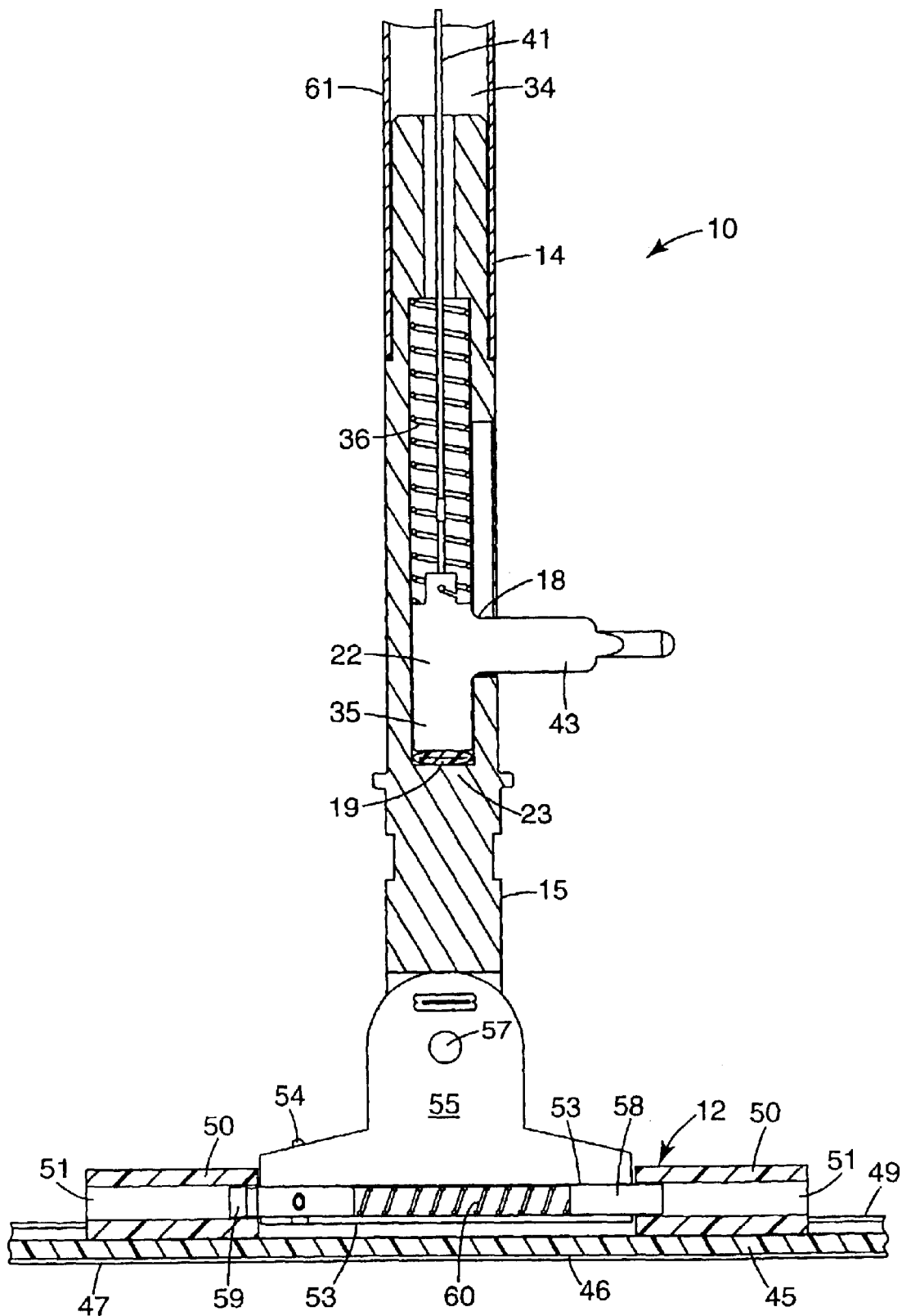
FIG. 3 is an enlarged fragmentary sectional view taken approximately along line 3—3 of FIG. 2.
Figure 4:
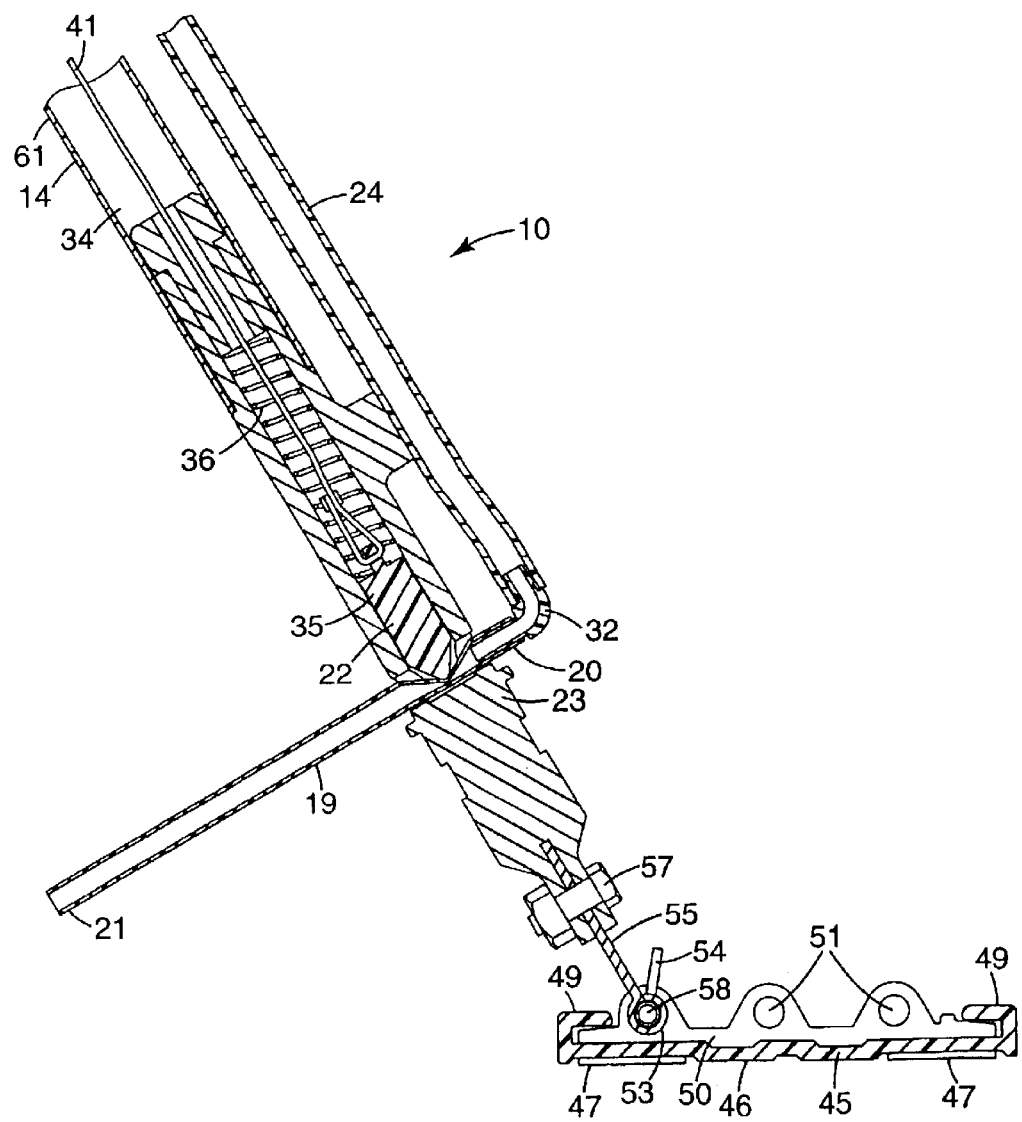
FIG. 4 is an enlarged fragmentary sectional view taken approximately along line 4—4 of FIG. 2.

Referring now to FIGS. 1 through 4 of the drawing there is illustrated a mop assembly 10 according to the present invention that can be used for applying liquid (e.g., floor coatings, floor cleaners, floor sealers, floor finishes, disinfectants, etc.) to a surface such as the surface of a floor.

The mop assembly 10 comprises a mop head 12, an elongate handle 14 having a first end 15 pivotally attached to the mop head 12, and a portion adjacent an opposite second end 16 that is adapted to be manually engaged to move the mop head 12 along the surface. A valve assembly 18 mounted on the handle 14 adjacent its first end 15 has inlet and outlet openings at and provided by opposite ends 20 and 21 of a length 19 of resiliently flexible elastic tubing (e.g., $\frac{5}{16}$ O.D. latex tubing) included in the valve assembly 18 that has a portion extending transversely through the handle 14. The valve assembly also includes first and second members 22 and 23 in the handle 14 on opposite sides of the length 19 of tubing that are relatively movable between a closed position at which the first and second members 22 and 23 press or pinch together opposite sides of that portion of the length 19 of tubing to stop the flow of liquid through the length 19 of tubing, and an open position at which the first and second members 22 and 23 are spaced apart to afford resilient separation of the opposite sides of the length 19 of tubing and flow of liquid through the length 19 of tubing. A length 24 of flexible hose has one end connected to a liquid container 26 that is elevated above the mop head 12 (e.g., positioned in a back pack 28 shown in FIG. 8 that can be worn by the person using the mop assembly 10). The length 24 of hose has an opposite end connected to the end 20 of the length 19 of tubing that provides the inlet opening 20 of the valve assembly by a connector 32 so that the length 24 of hose can conveying liquid from the container 26 to the valve assembly 18. The connector 32 has projecting hose barbs disposed at a right angle to each other that engage within the length 24 of shoe and the length 19 of tubing.

The liquid container 26 can be the polymeric bag described as a one gallon, two ply poly nylon bag that is commercially available from Scholle Corporation, North Lake, Ill. The container 26 can optionally have an opening closed by a screw cap, plug, or other suitable closure mechanism 29 through which opening the container 26 can be refilled.

Optionally, an outlet nozzle (not shown) in the form of a generally T or Y shaped piece of polymeric tubing or a manifold with more than two outlets can have an inlet portion inserted into the end 21 of the length 19 of tubing and can separate the liquid passing through the length 19 of tubing into two or more streams to thereby dispense the liquid in two or more pools beside the pad 48 which can facilitate even distribution of liquids by the pad 48 of the mop assembly 10.

Should liquid in the length 19 of tubing become thickened or solidify so that it restricts or blocks flow of liquid through the length 19 of tubing, the length 19 of tubing can either be stretched and squeezed to help pass the thickened or solidified material, or the connector 32 can be removed from the length 19 of tubing and the length 19 of tubing can be withdrawn from between the first and second members 22 and 23 of the valve assembly 18 in their open position, and then replaced by a new length 19 of tubing.

The length 24 of flexible hose is attached to the handle 14 by spaced clips, the uppermost clip 31 comprising a flexible tube formed from a helical length of polymeric material through which the length 24 of flexible hose extends, which tube can bend with the length 24 of hose and will restrict crimping of the length 24 of hose adjacent the clip 31.

The handle 14 of the mop assembly 10 has a central passageway 34. The second member 23 of the valve assembly 18 is part of the handle 14 and forms an end of the passageway 34. The first member 22 of the valve assembly 18 includes a first part 35 within the passageway 34 that is moveable longitudinally along the passageway 34, and the valve assembly 18 includes a spring 36 biasing the members 22 and 23 to their closed position at which the first and second members 22 and 23 press or pinch together opposite sides of the length 19 of tubing to stop the flow of liquid through the length 19 of tubing. An L-shaped trigger member 37 is pivotally mounted by a pin 38 on a trigger support casting 39 that has a cylindrical portion engaged in a tubular portion of the handle 14 at its second end 16. A connecting assembly 41 within the passageway 34 has a first end attached to the first member 22 of the valve assembly 18 and an opposite second end attached to a first end portion 40 of the trigger member 39. A cover 33 attached to the casting 39 covers all of the trigger member 37 except for a second end portion 42 that projects from beneath the trigger housing 39 and extends along the outer surface of the handle 14. Pivotal movement of the trigger member 39 by manually engaging that projecting second end portion 42 moves the first member 22 to the open position of the valve members 22 and 23 against the bias of the spring 37.

The first member 22 of the valve assembly 18 further includes a second part 43 extending through a longitudinally extending slot in the handle 14 and projecting from the side of the handle 14. That second part 43 can be manually engaged to move the valve members 22 and 23 to their open position which can be useful, for example, to change the length 19 of tubing.

The outer end of the second part 43 is cylindrical and sized so that the end 21 of the length 19 of tubing can be pressed over it when the mop assembly 10 is not in use to restrict entrance of air into the length 19 of tubing and thereby restrict thickening or solidification of liquid within the length 19 of tubing.

The mop head 12 includes an elongate channel 45 (e.g., of aluminum) having a bottom surface 46 on which are adhered several (e.g., two as illustrated) longitudinally extending spaced fastener strips 47 (e.g., strips of the hook portion of a hook and loop fastener). Those fastener strips 47 releasably attach to the bottom surface of a soft absorbable pad 48 that can be moved along the surface. A suitable pads 48 include the pad commercially available under the trade designation "Micro fiber Flat Mop Pad" from Clean Systems US, Middle Valley, Calif. and the pad commercially available under the trade designation "Micro Fiber Mop 030213F, AF1-Pile-TF" from Daego Co. Ltd., Kwanynag-Dong, Dongan-Ku, Anyang, Republic of Korea. On the top side of the length 45 of channel opposite its bottom surface 46 are projecting opposed spaced generally L-shaped lips 49 between which, centrally of the channel 45, extend spaced brackets 50 having a plurality of (e.g., 3) pairs of axially aligned sockets 51. Any one of those pairs of sockets 51 can receive cylindrical pins 58 and 59 projecting from an attachment device 53 on the first end 15 of the handle 14 so that the mop head 12 can pivot with respect to the handle 14 around a first axis parallel to the length of the mop head 12. The attachment device 53 extends along the bottom edge of a plate 55. A portion of the plate 55 opposite the attachment device 53 is attached to a first end 15 of the handle 14 by a bolt 57 for pivotal movement of the handle around a second axis at a right angle to the first axis. One of the projecting pins 58 on the attachment device 53 is fixed with respect to the plate 55. The other pin 59 is longitudinally movable with respect to the plate 55 between a retracted position within the plate 55 and a projecting position to which it is biased by a spring 60 and at which projecting position the pin 59 will engage one of the sockets 51 opposite and aligned with the socket 51 in which the fixed pin 58 is engaged. A projection 54 from the side of the moveable pin 59 can be manually engaged to move the pin 59 to its retracted position against the bias of the spring 60 so that the plate 55 can be engaged with or removed from engagement with an aligned pair of the sockets 51.

Figure 6:
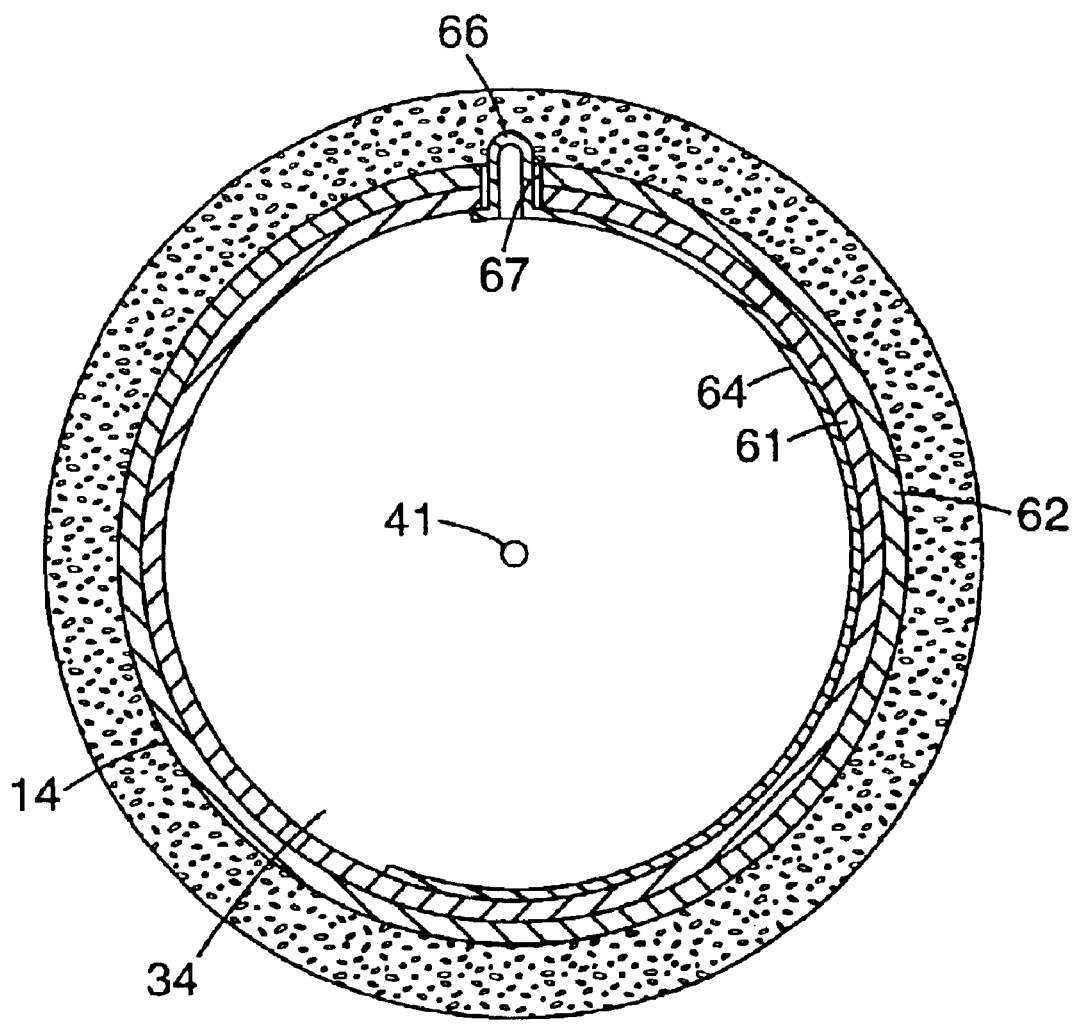
FIG. 6 is an enlarged fragmentary sectional view taken approximately along line 6—6 of FIG. 1.

The handle 14 includes first and second telescoping cylindrically tubular handle portions 61 and 62 with a portion of the first tubular portion 61 within the tubular portion 62 and axially slideable therein between an extended use position (FIGS. 1 and 8) and a retracted storage position (FIG. 9) at which the first and second ends 15 and 16 of the handle 14 are more closely spaced than in the extended position. A latch assembly 63 is provided for releasably retaining the two tubular portions 61 and 62 in either of those positions. The latch assembly (see FIG. 6) comprises a semi cylindrical resiliently flexible member 64 within the first tubular portion 61 along one edge of which is a projection 66 projecting radially of the handle 14 and through an opening in the fist tubular portion 61. The second tubular portion 62 has axially spaced openings 67 and 68, either of which can be aligned to receive the projection 66, the opening 67 being positioned to receive the projection 66 to lock the handle portions 61 and 62 in their extended position, and the opening 68 being positioned to receive the projection 66 to lock the handle portions 61 and 62 in their retracted position. Indicia can be provided on the handle portions to indicate proper alignment of the handle portions 61 and 62 so that the projection 66 can enter the openings 67 and 68. The connecting assembly 41 can comprise a flexible metal cable having its opposite ends attached to the first end portion 40 of the trigger member 37 and to the first member 22 of the valve assembly 18, which cable extends directly between those members 22 and 37 when the handle portions 61 and 62 are in their extended position, and coils within the passageway 34 when the handle portions 61 and 62 are in their retraced position. Alternatively, the connecting assembly 41 can include a first part that can be a stiff wire connected at one end to and projecting from the first member 22 of the valve assembly 18 that has a loop at its second end opposite the first member 22, and a second part that can be a stiff or a flexible wire connected at one end to and projecting from the first end portion 40 of the trigger member 37, which second part extends through the loop at the end of the first part and has a lug at its distal end that can not move through that loop. The first and second parts of that connecting assembly extend between the members 22 and 37 with the lug at the loop when the handle portions 61 and 62 are in their retracted position, and telescope together while remaining generally straight when the handle portions 61 and 62 move to their retracted position.

Figure 7:
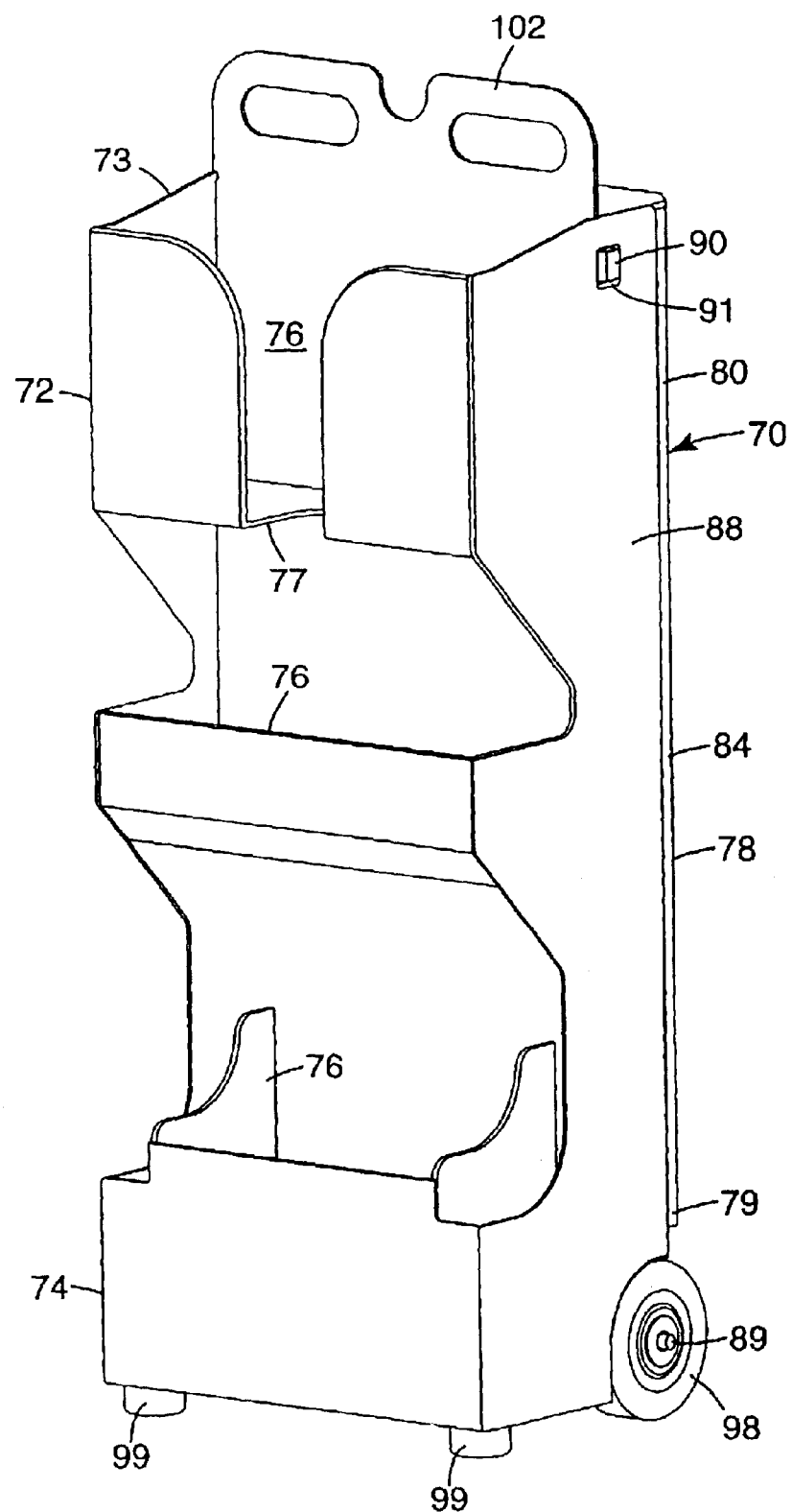
FIG. 7 is a perspective view of a cart assembly according to the present invention that can be used with the mop assembly of FIG. 1.
Figure 8:
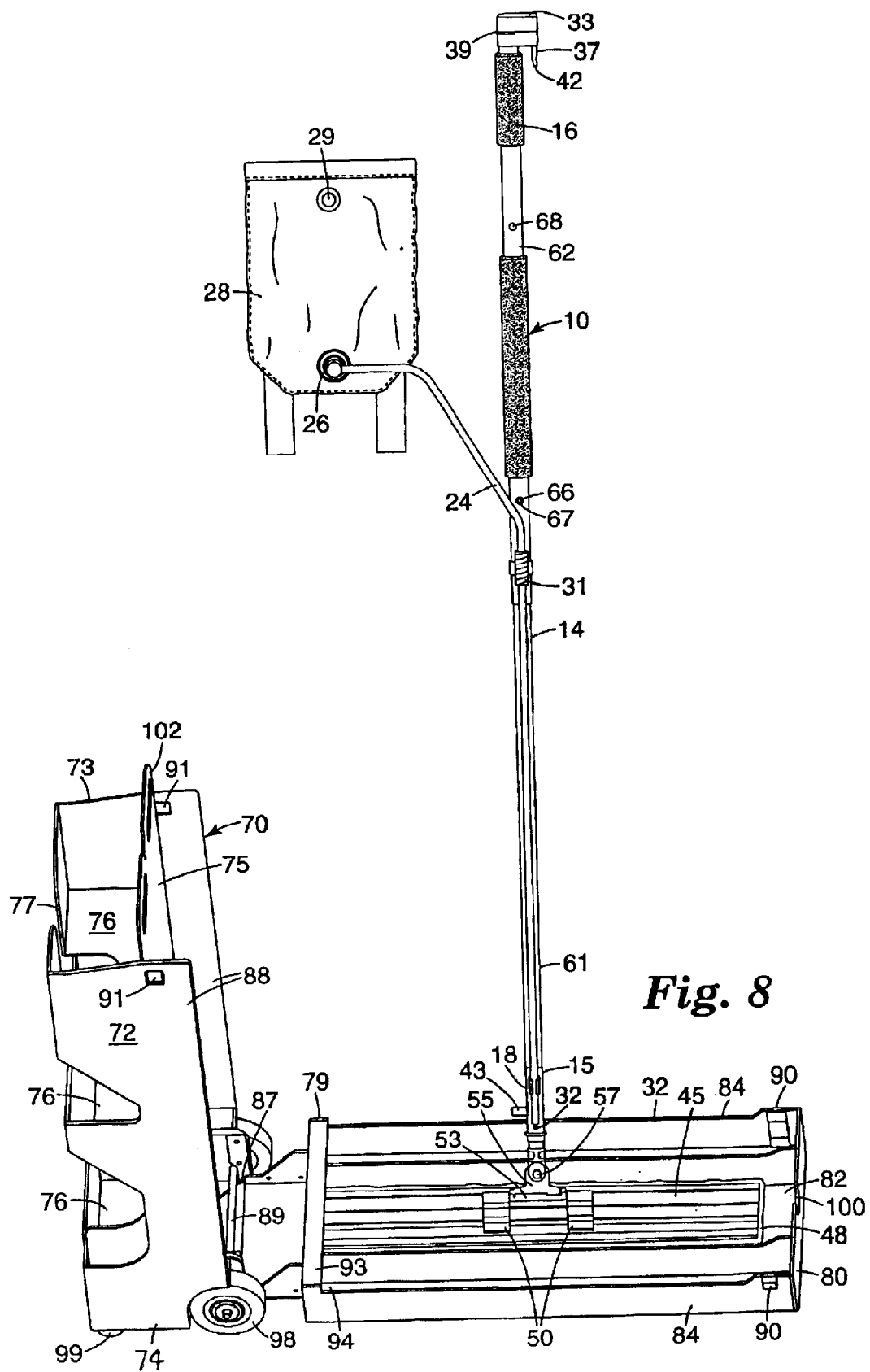
FIG. 8 is a perspective view of the cart assembly of FIG. 7 in which a tray portion of the cart assembly has been moved to an open position from a closed position shown in FIG. 7 and in which the mop assembly of FIG. 1 is shown in a receptacle in the tray portion.
Figure 9:
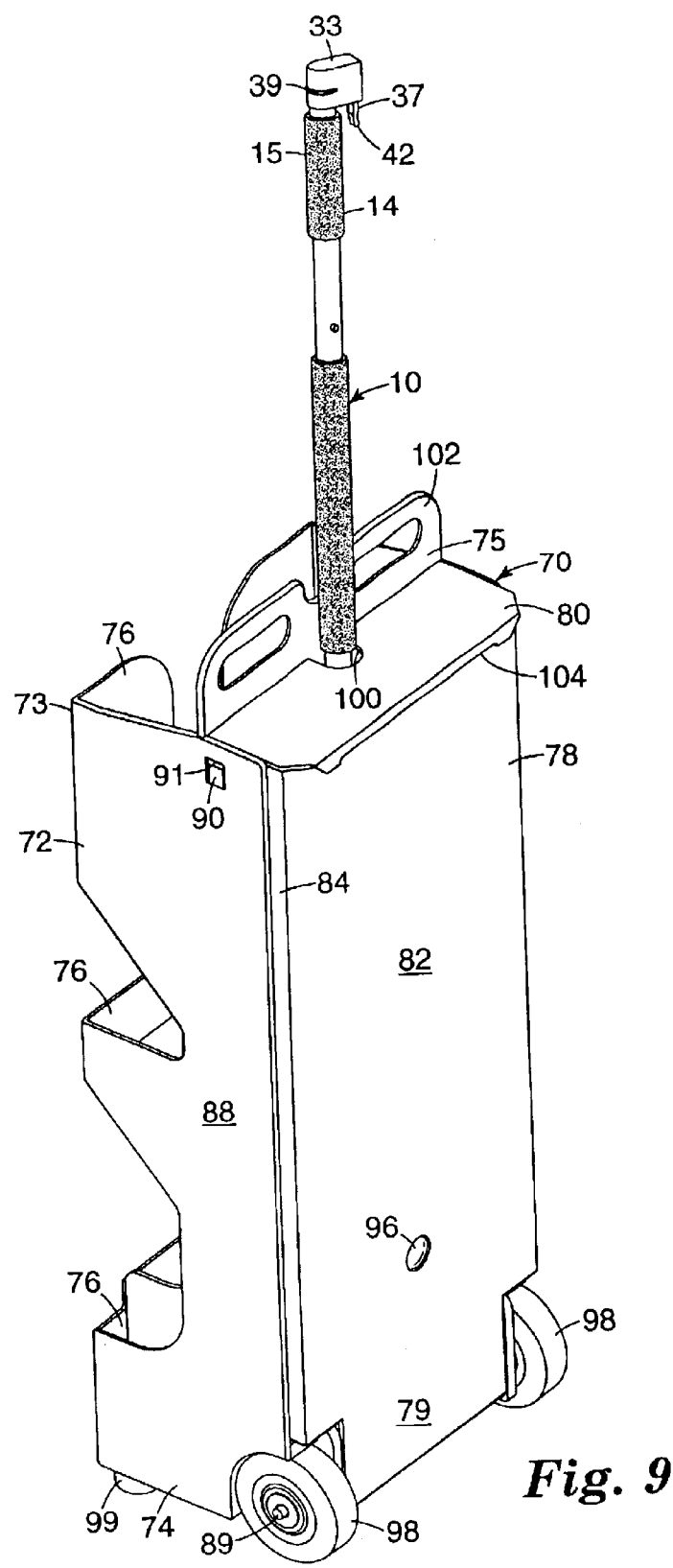
FIG. 9 is a side view of the cart assembly of FIG. 5 enclosing the mop assembly of FIG. 1 with the tray portion of the cart assembly in its closed position.

FIGS. 7 through 9 illustrate a storage cart 70 according to the present invention that can be used in conjunction with a mop assembly such as the mop assembly 10 described above. That storage cart includes an elongate main portion 72 having longitudinally spaced top and bottom ends 73 and 74, and walls (which can be molded of a stiff polymeric material such as polypropylene) having a continuous rectangular side surface 75 extending between its top and bottom ends 73 and 74. The walls of the main portion 72 also form a plurality of receptacles 76 (three as illustrated) opening on the side of the main portion 72 opposite its side surface 75 which can be used for storing items used with the mop assembly 10 such as pads 48, liquid containers 26, tools, rags, or tape. The uppermost receptacle 76 is particularly adapted to store the backpack 28 adapted to support the liquid container 26 filled with a supply of liquid by having a central opening 77 through which the length of hose 24 attached to that container 26 can extend.

Figure 5:
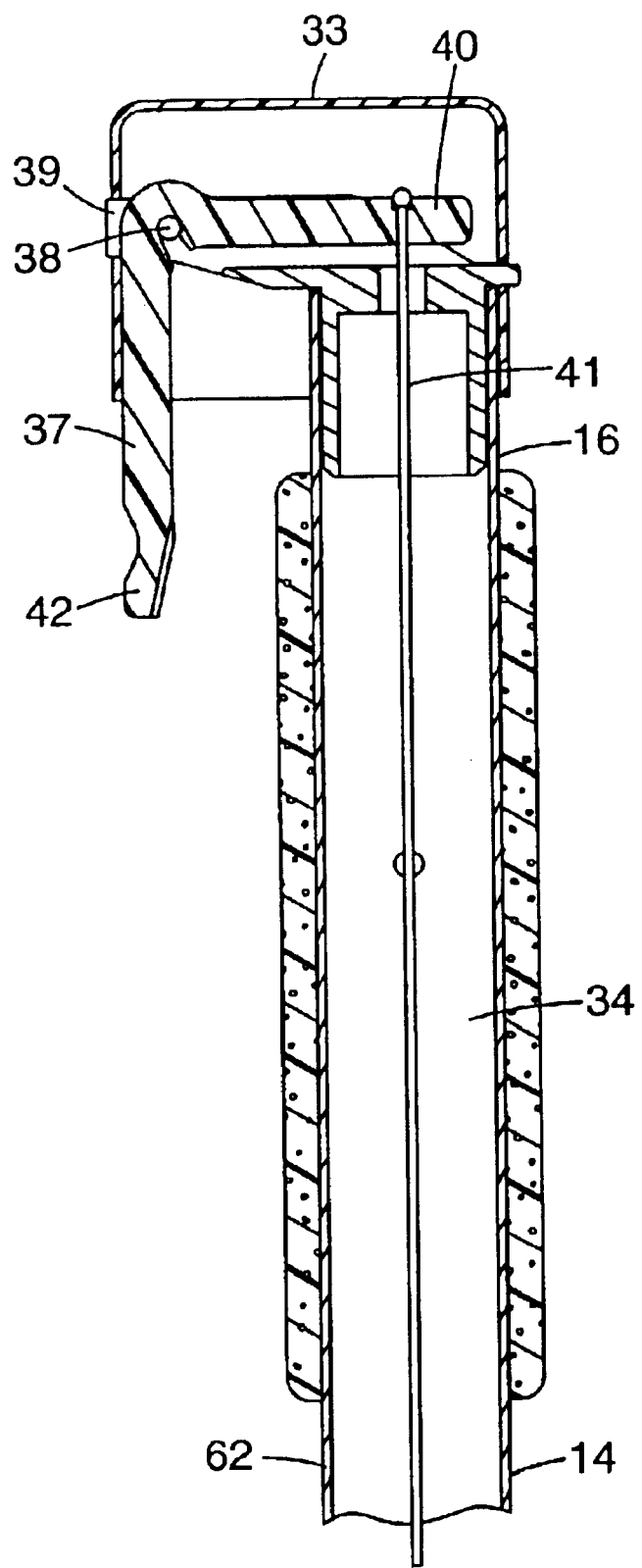
FIG. 5 is an enlarged fragmentary sectional view taken approximately along line 5—5 of FIG. 1.

The storage cart 70 also includes an elongate tray portion 78 having longitudinally spaced first and second ends 79 and 80, a continuous bottom wall 82 extending between its first and second ends 79 and 80, and side walls 84 projecting from the bottom wall 82 that have distal ends in a common plane. The side and bottom walls 82 and 84 provide a receptacle 86 adapted to receive the mop head 12, which receptacle 86 contains liquid when the bottom wall 84 is lowermost and supported on a horizontal surface. The first end 79 of the tray portion 78 is mounted on the bottom end 73 of the main portion 72 by pivot pins 87 for relative movement of the tray portion 78 with respect to the main portion 72 between a closed position (FIGS. 5 and 7) with the distal edges of the side walls 84 along the side surface 75 of the main portion 72 and the side walls 84 between spaced projecting walls 88 on the main portion 72 to cover the open side of the receptacle 86 and thereby afford retention of the mop head 12 in the receptacle 86 as shown in FIG. 7; and an open position (FIG. 6) with the tray portion 78 disposed at about a right angle with respect to the main portion 72 so that the mop head 12 can be inserted into or removed from the receptacle 86 in the tray portion 78, and so that, with the top end 73 of the main portion 72 projecting vertically upwardly from a horizontal surface such as a floor surface, the bottom wall 82 can be supported along that horizontal or floor surface with the side walls 84 of the receptacle projecting vertically upwardly. In that position the receptacle 86 will retain liquid and the mop head 12 can be positioned in the receptacle for various purposes such to store the mop assembly 10 with its mop head 12 off of a floor surface between uses of the mop assembly 10.

Optionally the pivot pins 87 by which the first end 79 of the tray portion 78 is mounted on the bottom end 73 of the main portion 72 can be received in journals from which they can be manually removed, such as resiliently flexible generally C shaped journals, so that the tray portion 78 can be manually removed from the main portion 72 should that be desired by a user of the cart 70. Alternatively, such resiliently flexible generally C shaped journals could be provided on the bottom end 73 of the main portion in the place of the pivot pins 87 and those generally C shaped journals could be releasably engaged over a cylindrical axle shaft 89 on which wheels 98 for the cart are mounted to provide both relative movement of the tray portion 78 with respect to the main portion 72 between its closed position and open positions and manual removal of the tray portion 78 from the main portion 72.

The bottom wall 82 has a through opening in which is normally positioned a plug 96 that can be removed to drain liquid from the receptacle 86.

Latch members are provided on the main and tray portions 72 and 78 for releasably retaining them in the closed position. Those latch members include generally rectangular lugs 90 at the distal ends of resiliently flexible elongate projections on opposite sides of the tray portion 72 close to its second end 80 and parts of the projecting walls 88 of the main portion 72 that have through openings 91 in which the lugs 90 can be received to retain the main and tray portions 72 and 78 in their closed position. The lugs 90 have cam surfaces adapted to resiliently deflect the projections carrying the lugs 90 inwardly so that they slide along the inner surfaces of the walls 88 and into the openings 91 when the tray portion 78 is moved from its open position to its closed position. When the tray portion 78 is in its closed position the lugs 90 can be manually pressed toward each other and then away from the side surface 75 to cause movement of the tray portion 72 from its closed position toward its open position.

The tray portion 78 includes a retaining wall 93 on the distal ends of the side walls 84 adjacent the first end 79 of the tray portion 78 to provide with parts of the bottom wall 82 and side walls 84 a liquid tight container 94 at the first end 79 of the tray portion 78. The container 94 will receive and contain liquid from within the receptacle 86 (and/or from the mop head 12 if it is in the receptacle 86) when the tray portion 78 is in its closed position with the top end 73 of the main portion 72 projecting generally vertically upwardly.

The co-axial wheels 98 are mounted for rotation by the axle shaft 89 on the main portion 72 at its bottom end 74 adjacent its side surface 75 to affording rolling movement of the storage cart 70 along a horizontal surface. Cylindrical polymeric feet 99 on the bottom end 74 of the main portion 72 together with the wheels 98 can support the main portion 72 with its top end 73 projecting upwardly.

One of the side walls 84 at the second end 80 of the tray portion 78 has a passageway 100 adapted to receive a part of the handle 14 of the mop assembly 10 when its mop head 12 is in the receptacle 86 and the tray portion 78 is in its closed position. A portion of the handle 14 adjacent its second end 16 (preferably with the parts of the handle in their retracted position) then projects from the cart 70 and can be manually engaged to move the mop assembly 10 and the storage cart 70 along a horizontal surface.

The main portion 72 of the cart 70 has a handle 102 at its top end 73 that can be manually engaged to move the storage cart 70 along a horizontal surface.

An L-shaped lip 104 extending across the second end 80 of the tray portion 78 provides support for the second end 80 of the tray portion 78 when it is in its open position. The lip 104 can also be used to hang the cart 70 on a hanger in a closet or elsewhere, should that be desired. Alternatively, the cart 70 could also be hug by the handle 102.

The storage cart 70 can be made with of a bright colored polymeric material, can be painted with a bright colored paint, and/or can have bright colored appliques applied to it so that it can be used to designate locations where maintenance work is being done and/or where persons should not enter.

The present invention has now been described with reference to one embodiment and several possible variations, modifications, and uses thereof. It will be apparent to those skilled in the art that many changes can be made in the embodiment described without departing from the scope of the present invention. Thus, the scope of the present invention should not be limited to the structures and methods described in this application, but only by the structures and methods described by the language of the claims and the equivalents thereof.

What is claimed is:

1. A mop assembly for applying liquid to a surface, said assembly comprising:

a mop head;
an elongate handle having a first end pivotally attached to said mop head, an opposite second end, and a portion adjacent said second end adapted to be manually engaged to move the mop head along the surface;
a container for a supply of the liquid adapted to be supported above the mop head;
a valve assemble mounted on said handle adjacent said first end, having an inlet opening and an outlet opening, and having first and second members relatively movable between a closed position to stop the flow of liquid through said valve between said inlet and outlet openings, and an open position allowing the flow of liquid between said inlet and outlet openings, and
a flexible hose extending and being connected between said container and said inlet opening of said valve assembly for conveying liquid from said container to said valve assembly;
said valve assembly comprising a length of resiliently flexible tubing having an inlet end providing said inlet opening, an outlet end providing said outlet opening, and a portion of said length of tubing between said inlet and outlet ends extending between said first and second members of said valve assembly, said first and second members being positioned to press together opposite sides of said length of tubing in said closed position to stop flow of liquid through said length of tubing, and being spaced apart in said open position to afford separation of the opposite sides of said length of tubing and flow of liquid through the length of tubing.

2. A mop assembly according to claim 1 wherein said length of tubing can be withdrawn from or inserted between said first and second members of said valve assembly in the open position of said valve assembly and said mop assembly include a connector between said hose and the inlet end of said length of tubing affording manual removal and attachment of said length of tubing to facilitate replacement of the length of tubing in said mop assembly.

3. A mop assembly according to claim 1 wherein said length of tubing is elastic and can be stretched and squeezed to help pass thickened or solidified liquid from within the length of tubing.

4. A mop assembly according to claim 1 wherein said handle has a central passageway, said second member is a part of said handle and defines an end of said passageway, said first member comprises a first part within said passageway and moveable longitudinally along said passageway, said portion of said length of tubing between said inlet and outlet ends extends transverse of said handle and said passageway between said first and second members, and said valve includes a spring biasing said members to said closed position.

5. A mop assembly according to claim 4 wherein said first member of said valve assembly further includes a second part extending through a slot in said handle and projecting from said handle, said second part being manually engageable to afford movement of said valve member to said open position.

6. A mop assembly according to claim 4 further including a manually engageable trigger member pivotally mounted on said handle at said second end and a connecting assembly within said passageway having a first end attached to said first member of said valve assembly and an opposite second end attached to said trigger, pivotal movement of said trigger moving said first member to said open position of said valve member.

7. A mop assembly according to claim 6 wherein said first member of said valve assembly further includes a second part extending through a slot in said handle and projecting from said handle, said second part being manually engageable to afford movement of said valve members to said open position.

8. A mop assembly according to claim 1 further including a backpack including a flexible bag adapted to receive and support said container for a supply of the liquid.

9. In combination:
a mop assembly for applying liquid to a surface, said mop assembly comprising a mop head, and an elongate handle having a first end pivotally attached to said mop head, an opposite second end, and a portion adjacent said second end adapted to be manually engaged to move the mop head along the surface; and
a storage cart for said mop assembly, said storage cad including
an elongate main portion having longitudinally spaced top and bottom ends, and walls defining a second surface extending between said top and bottom ends;
an elongate tray portion having longitudinally spaced first and second ends, a bottom wall extending between said first and second ends and side walls projecting from said bottom wall and having distal ends, said side and bottom walls providing a receptacle for said mop head, the first end of said tray portion being mounted on the bottom end of said main portion for relative movement of said portions between a closed position with the distal edges of said side walls along said second surface of said main portion to afford retention of said mop head in the receptacle by said second surface of said main portion, and an open position with said main and tray portions disposed at about a right angle with respect to each other so that the mop head can be inserted into or removed from the receptacle in the tray portion, and so that with the top end of said main portion projecting vertically upwardly from a horizontal surface said bottom wall can be disposed along that horizontal surface with the side walls of the receptacle projecting vertically upwardly;
latch members on said main and tray portions for releasably retaining said main and tray portions in said closed position; and
coaxial wheels mounted for rotation on said first portion at said bottom end for affording rolling movement of said storage cart along a surface.

10. A combination according to claim 9 wherein said tray portion includes a retaining wall on the distal ends of said side walls adjacent the first end of said tray portion to provide a liquid tight container at said first end of said tray portion for receiving and containing liquid when the main and tray portions are in said closed position, and the top end of the main portion is projecting generally vertically upwardly.

11. A combination according to claim 9 wherein one of said side walls adjacent the second end of said tray portion has a passageway adapted to receive a part of the handle of the mop assembly when the head of the mop assembly is received in the receptacle and the main and tray portions are in said closed position, a portion of the handle adjacent the second end of the handle then projecting from the cart being manually engageable to move the mop and cart along the horizontal surface.

12. A combination according to claim 11 wherein said handle comprises two parts mounted on each other for relative longitudinal sliding movement between an extended position and a retracted position at which the first and second ends of the handle are more closely spaced than in said extended position, and a latch assembly for releasably retaining said two parts in either of said positions, in said retracted position the portion of the handle adjacent the second end of the handle projecting from the cart when the head of the mop assembly is received in the receptacle and the main and tray portions am in said closed position being a convenient length to be manually engageable to move the cart containing the mop head along the horizontal surface.

13. A combination according to claim 9 wherein said walls of said main portion define a plurality of receptacles opening on the side of said first portion opposite said second surface.

14. A combination according to claim 9 wherein said main portion has a handle at the top end of said main portion, said handle being manually engageable to move the cart along the horizontal surface.

15. A combination according to claim 14 wherein said length of tubing can be withdrawn from or inserted between said first and second members of said valve assembly in the open position of said valve assembly and said mop assembly includes a connector between said hose and the inlet end of said length of tubing affording manual removal and attachment of said length of tubing to facilitate replacement of the length of tubing in said mop assembly.

16. A mop assembly according to claim 14 wherein said handle has a central passageway, said second member is a part of said handle and defines an end of said passageway, said first member comprises a first part within said passageway and moveable longitudinally along said passageway, said portion of said length of tubing between said inlet and outlet ends extends transverse of said handle and said passageway between said first and second members, and said valve includes a spring biasing said members to said closed position.

17. A combination according to claim 14 wherein said first member of said valve assembly further includes a second part extending through a slot in said handle and projecting from said handle, said second part being manually engageable to afford movement of said valve members to said open position.

18. A combination according to claim 14 further including a manually engageable trigger member pivotally mounted on said handle at said second end and a connecting assembly within said passageway having a fist end attached to said first member of said valve assembly and an opposite second end attached to said trigger, pivotal movement of said trigger moving said first member to said open position of said valve members.

19. A combination according to claim 14 further including a backpack including a flexible bag adapted to receive and support said container for a supply of the liquid, at least one of said receptacles in said main portion being adapted to receive said container within said backpack.

20. A combination according to claim 9 wherein said mop assembly further includes:
   a container for a supply of the liquid adapted to be supported above the mop head;
   a valve assembly mounted on said handle adjacent said first end, having an inlet opening and an outlet opening, and having first and second members relatively movable between a closed position to stop the flow of liquid through said valve between said inlet and outlet openings, and an open position allowing the flow of liquid been said inlet and outlet openings; and
   a flexible hose extending and being connected between said container and said inlet opening of said valve assembly for conveying liquid from said container to said valve assembly;
   said valve assembly comprising a resiliently flexible length of tubing having an inlet end providing said inlet opening, an outlet end providing said outlet opening, and a portion of said length of tubing between said inlet and outlet ends extending between said first and second members of said valve assembly, said first and second members being positioned to press together opposite sides of said length of tubing in said closed position to stop flow of liquid through said length of tubing, and being spaced apart in said open position to afford separation of the opposite sides of said length of tubing and flow of liquid through the length of tubing.

21. A storage cart for a mop assembly used to apply liquid to a surface, which mop assembly comprises a mop head, and an elongate handle having a first end pivotally attached to the mop head, an opposite second end, and a portion adjacent said second end adapted to be manually engaged to move the mop head along the surface, said storage cart including:
   an elongate main portion having longitudinally spaced top and bottom ends, and walls defining a continuous second surface extending between said top and bottom ends;
   an elongate tray portion having longitudinally spaced first and second ends, a bottom wail extending between said first and second ends and side walls projecting from said bottom wall and having distal ends, said side walls defining with said bottom wall a receptacle for said mop head, the first end of said tray portion being mounted on the bottom end of said main portion for relative movement of said portions between a closed position with the distal edges of said side walls along said second surface of said main portion to afford retention of said mop head in the receptacle by said second surface of said main portion, and an open position with said main and tray portions disposed at about a right angle with respect to each other so that the mop head can be inserted into or removed from the receptacle in the tray portion and with the top end of said main portion projecting vertically upwardly from a horizontal surface said bottom wall can be disposed along that horizontal surface with the side walls of the receptacle projecting vertically upwardly;
   latch numbers on said main and tray portions for releasably retaining said main and tray portions in said closed position; and
   coaxial was mounted for rotation on said first portion at said bottom end for affording rolling movement of said storage cart along a surface.

22. A storage cart according to claim 21 wherein said tray portion includes a retaining wall on the distal ends of said side walls adjacent the first end of said tray portion to provide a liquid tight container at said first end of said tray portion for receiving and containing liquid from the mop head when the head of the mop assembly is received in the receptacle, the main and tray portions are in said closed position, and top end of the main portion is projecting generally vertically upwardly.

23. A storage cart according to claim 21 wherein one of said side walls adjacent the second end of said tray portion has a passageway adapted to receive a part of the handle of the mop assembly when the lead of the mop assembly is received in the receptacle and the main and tray portions are in said closed position, a portion of the handle adjacent the second end of the handle then projecting from the cart being manually engageable to move the mop and cart along the horizontal surface.

24. A storage cart according to claim 21 wherein said main portion has a handle at the top end of said main portion, said handle being manually engageable to move the cart along the horizontal surface.

25. A storage cart according to claim 21 wherein said walls of said main portion define a plurality of receptacles opening on the side of said first portion opposite said second surface.

26. A storage cart according to claim 21 wherein said tray portion is manually removable from and repositionable on said main portion.

* * * * *

UNITED STATES PATENT AND TRADEMARK OFFICE
CERTIFICATE OF CORRECTION

PATENT NO.   : 6,854,912 B2
DATED        : February 15, 2005
INVENTOR(S)  : Dyer, John J.

It is certified that error appears in the above-identified patent and that said Letters Patent is hereby corrected as shown below:

Title page,
Item [56], References Cited, U.S. PATENT DOCUMENTS, please add the following references:
-- 3,412,419    11/1968    Barnhart
   4,119,386    10/1978    Cushing
   4,152,084    05/1979    Melton et al.
   6,227,744 B1 05/2001    Fodrocy et al.
   2003/0197027 10/2003    Dyer --.

Item [57], ABSTRACT, please delete the entire ABSTRACT and insert the following:
-- A mop assembly including a mop head and handle, and a supply of liquid connected to a valve assembly on the handle. The valve assembly includes a length of resiliently flexible tubing that has a portion extending transversely through the handle and members on opposite sides of the length of tubing that are relatively movable between a closed position at which the members pinch together opposite sides of the length of tubing to stop the flow of liquid through it, and an open position at which the members are spaced apart to afford flow of liquid through it. A storage cart includes a main portion and a tray portion having a receptacle for receiving the mop head mounted on the main portion for relative movement between a vertical closed position at which the side surface covers an open side of the receptacle; and a horizontal position at which the mop head can be inserted into or removed from the receptacle. --.

Column 6,
Line 34, delete "fist" and insert -- first --.

Column 9,
Line 8, delete "assemble" and insert -- assembly --.
Line 32, delete "include" and insert -- includes --.
Lines 53 and 61, delete "member" and insert -- members --.

Column 10,
Line 11, delete "cad" and insert -- cart --.
Line 37, delete "coaxial" and insert -- co-axial --.
Line 65, delete "am" and insert -- are --.

UNITED STATES PATENT AND TRADEMARK OFFICE
CERTIFICATE OF CORRECTION

PATENT NO. : 6,854,912 B2
DATED : February 15, 2005
INVENTOR(S) : Dyer, John J.

It is certified that error appears in the above-identified patent and that said Letters Patent is hereby corrected as shown below:

Column 11,
Line 34, delete "fist" and insert -- first --.
Line 54, delete "been" and insert -- between --.

Column 12,
Line 15, delete "wail" and insert -- wall --.
Line 33, delete "numbers" and insert -- members --.
Line 36, delete "coaxial was" and insert -- co-axial wheels --.
Line 50, delete "lead" and insert -- head --.

Signed and Sealed this

Twenty-third Day of August, 2005

JON W. DUDAS
*Director of the United States Patent and Trademark Office*